United States Patent
Chen et al.

(10) Patent No.: US 12,407,233 B2
(45) Date of Patent: Sep. 2, 2025

(54) LINEAR VIBRATION MOTOR

(71) Applicant: AAC Microtech (Changzhou) Co., Ltd., Jiangsu (CN)

(72) Inventors: Weibo Chen, Changzhou (CN); Xiaorong Zhou, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 242 days.

(21) Appl. No.: 18/319,515

(22) Filed: May 18, 2023

(65) Prior Publication Data
US 2024/0283342 A1    Aug. 22, 2024

Related U.S. Application Data

(63) Continuation of application No. PCT/CN2023/076318, filed on Feb. 16, 2023.

(51) Int. Cl.
*H02K 33/02* (2006.01)
*H02K 33/16* (2006.01)

(52) U.S. Cl.
CPC ............. *H02K 33/02* (2013.01); *H02K 33/16* (2013.01)

(58) Field of Classification Search
CPC ................................ H02K 33/02; H02K 33/16
See application file for complete search history.

(56) References Cited

U.S. PATENT DOCUMENTS

| 2010/0213773 | A1* | 8/2010 | Dong | H02K 33/16 310/25 |
| 2018/0297077 | A1* | 10/2018 | Chai | B06B 1/045 |

FOREIGN PATENT DOCUMENTS

| CN | 113162358 A | * | 7/2021 | ............ H02K 1/34 |
| TW | 202118200 A | * | 5/2021 | ......... A61B 5/14552 |

OTHER PUBLICATIONS

Liu (CN 113162358 A) English Translation (Year: 2021).*
Little (TW 202118200 A) English Translation (Year: 2021).*

* cited by examiner

*Primary Examiner* — Tulsidas C Patel
*Assistant Examiner* — Robert E Mates
(74) *Attorney, Agent, or Firm* — Wiersch Law Group

(57) ABSTRACT

A linear vibration motor includes a housing with a receiving space, a vibration assembly, and a coil. The vibration assembly includes a mass block, a magnet assembly fixed to the mass block, and an elastic member. The mass block is provided with a receiving space for receiving the magnet assembly. The mass block includes a side wall and a bottom wall that enclose to form the receiving space. The magnet assembly includes a first magnet, a second magnet, and a third magnet that are fixed to the bottom wall. The mass block further includes a fixation boss protruding from the bottom wall toward the second magnet. The second magnet is fixed to the fixation boss. In the linear vibration motor, bonding strength between the magnet assembly and the mass block is good, which effectively improves vibration stability and magnetic field performance of the linear vibration motor.

5 Claims, 4 Drawing Sheets

A-A

B-B

LINEAR VIBRATION MOTOR

TECHNICAL FIELD

The present disclosure relates to a motor, and in particular, to a linear vibration motor applied to the field of mobile electronic products.

BACKGROUND

With the development of electronic technologies, portable consumer electronic products are becoming more and more popular, such as mobile phones, handheld game consoles, navigation apparatuses, or handheld multimedia entertainment devices. In these electronic products, linear vibration motors may generally be used for system feedback, such as mobile phone call prompts, information prompts, navigation prompts, and vibration feedback of game consoles.

A linear vibration motor in the related art includes a housing with a receiving space, a vibration assembly located in the receiving space, and a stator assembly fixed to the housing. The stator assembly includes a coil. The vibration assembly includes a mass block with a receiving space and a magnet received in a receiving hole. The coil interacts with the magnet to generate a driving force to drive the vibration assembly to vibrate back and forth, thereby providing a sense of vibration.

However, in a structure of the linear vibration motor in the related art, when the vibration assembly includes three or more magnets, generally, the magnets on two sides are first fixed to the mass block by gluing, but after the magnets on the two sides are glued and cured, glue overflows to positions of the magnets in the middle. After the magnets in the middle are assembled, the magnets interfere with the cured glue and cannot be fixed to a fixed surface of the mass block, leading to protrusion of the magnets in the middle, which not only reduces bonding strength of the magnets in the middle, causing a risk of falling off during the vibration, but also adversely affects magnetic field performance of a magnetic circuit unit.

Therefore, there is a need to provide a new linear vibration motor to solve the above problems.

SUMMARY

Based on the above problems, the present disclosure proposes a linear vibration motor with high magnet bonding strength.

In order to achieve the above objective, the present disclosure proposes a linear vibration motor. The linear vibration motor includes: a housing with a receiving space; a vibration assembly received in the receiving space; and a coil received in the receiving space. The vibration assembly includes a mass block received in the receiving space, a magnet assembly fixed to the mass block, and an elastic member that drives the mass block to move back and forth; the coil is arranged corresponding to the magnet assembly. The mass block is provided with a receiving space for receiving the magnet assembly. The mass block includes a side wall and a bottom wall that enclose to form the receiving space. The magnet assembly includes a first magnet, a second magnet, and a third magnet that are received in the receiving space and arranged in sequence along a first direction. The first magnet, the second magnet, and the third magnet are all fixed to the bottom wall by gluing. The mass block further includes a fixation boss protruding from the bottom wall toward the second magnet, the second magnet being fixed to the fixation boss.

As an improvement, along the first direction, the first magnet and the third magnet are spaced apart from the fixation boss.

As an improvement, along the first direction, a width of the fixation boss is less than a width of the second magnet.

As an improvement, the fixation boss extends along a second direction perpendicular to the first direction, and along the second direction, a width of the second magnet is greater than a width of the fixation boss.

As an improvement, an edge of the bottom wall is provided with a glue-receiving groove recessed away from the second magnet, and the glue-receiving groove has a ring shape.

As an improvement, along the second direction, two ends of the fixation boss extend to the glue-receiving groove.

As an improvement, along the first direction, an edge on a side of the first magnet away from the second magnet is arranged corresponding to the glue-receiving groove, and an edge on a side of the third magnet away from the second magnet is arranged corresponding to the glue-receiving groove.

As an improvement, a surface of the second magnet away from the fixation boss is flush with a surface of the first magnet away from the bottom wall.

Compared with the related art, the linear vibration motor according to the present disclosure includes a housing with a receiving space, a vibration assembly, and a stator assembly. The vibration assembly includes a mass block received in the receiving space, a magnet assembly fixed to the mass block, and an elastic member that drives the mass block to move back and forth. The mass block is provided with a receiving space for receiving the magnet assembly. The mass block includes a side wall and a bottom wall enclosed to form the receiving space. The magnet assembly includes a first magnet, a second magnet, and a third magnet that are received in the receiving space and arranged in sequence along a first direction. The first magnet, the second magnet, and the third magnet are all fixed to the bottom wall. The mass block further includes a fixation boss protruding from the bottom wall toward the second magnet. The second magnet is fixed to the fixation boss. The bottom wall of the mass block is provided with the fixation boss and the second magnet arranged at a middle position is fixed to the fixation boss, which prevents influence of overflowing glue on a fixed surface between the second magnet and the mass block during assembling the first magnet and the third magnet, effectively enhances bonding strength between the second magnet and the mass block, ensures vibration stability and magnetic field performance of the magnet assembly, and effectively improves vibration performance of the linear vibration motor.

DESCRIPTION OF EMBODIMENTS

The technical solution of the present disclosure is clearly and completely described below with reference to the accompanying drawings and specific embodiments.

Figure 1:
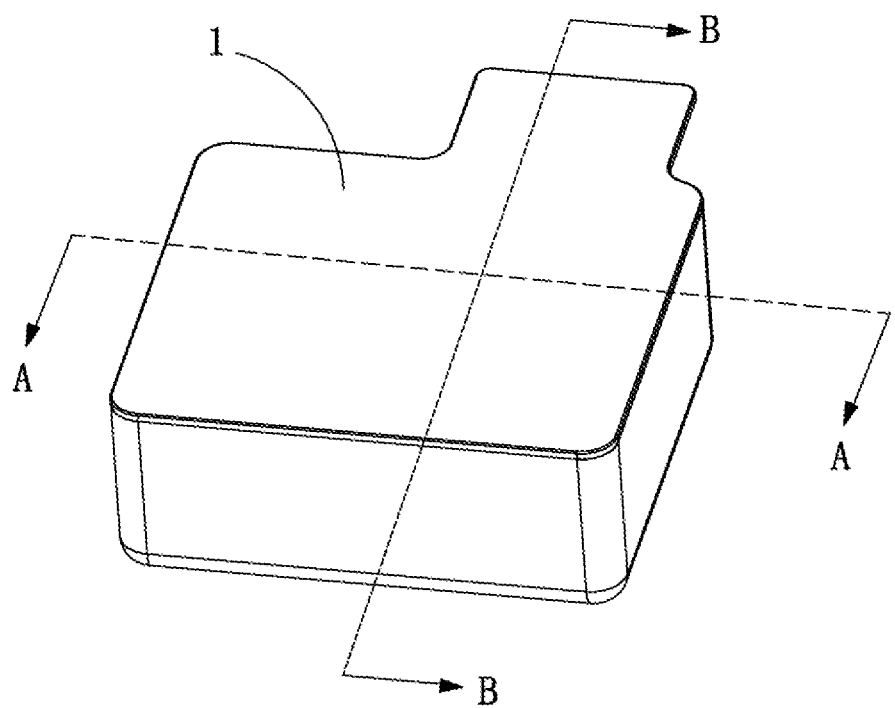
FIG. 1 is a perspective view of a linear vibration motor according to an embodiment of the present disclosure.
Figure 2:
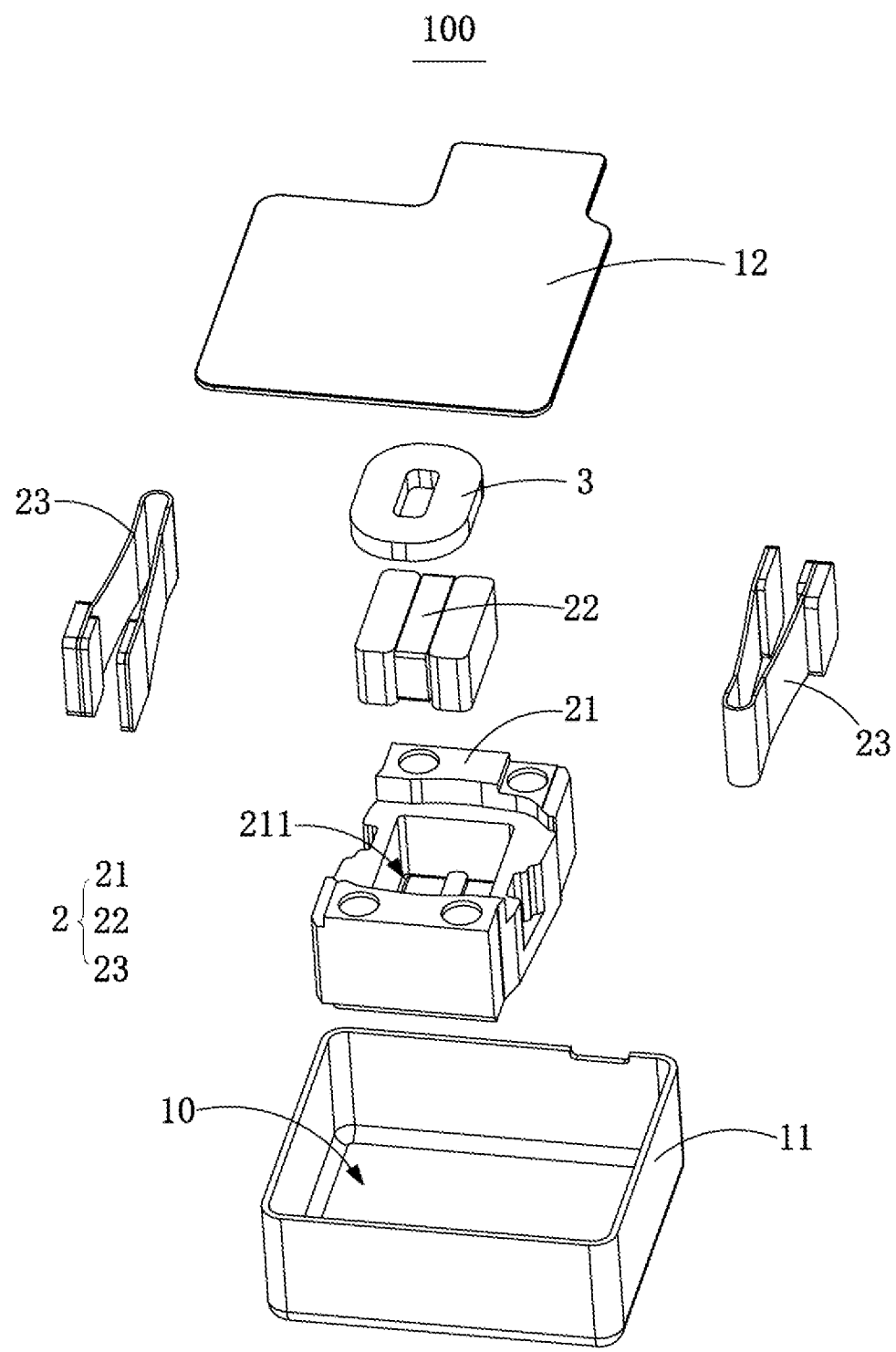
FIG. 2 is an exploded view of the linear vibration motor according to an embodiment of the present disclosure.

As shown in FIG. 1 and FIG. 2, the present disclosure provides a linear vibration motor 100, including a housing 1 with a receiving space 10 and a vibration assembly 2 and a coil 3 that are received in the receiving space 10. The coil 3 may drive the vibration assembly 2 to vibrate back and forth, so as to provide a sense of vibration.

The housing 1 includes an upper housing 11 with a receiving space and a lower cover 12 fixed to the upper housing 11. The upper housing 11 and the lower cover 12 are enclosed to form the receiving space 10.

The vibration assembly 2 includes a mass block 21 received in the receiving space 10, a magnet assembly 22 fixed to the mass block 21, and an elastic member 23 that drives the mass block 21 to move back and forth. Two elastic members 23 are provided. The two elastic members 23 are respectively located on two sides of the mass block 21. The elastic members 23 each has one end fixed to the mass block 21 and the other end fixed to the upper housing 11, so as to support the mass block 21 in the receiving space 10.

The coil 3 is fixed to the lower cover 12. The coil 3 is arranged opposite to the magnet assembly 22 and generates an interaction force to drive the mass block 21 and the magnet assembly 22 to vibrate back and forth.

As shown in FIG. 2 to FIG. 5, the mass block 21 is provided with a receiving space 211 for receiving the magnet assembly 22. The mass block 21 includes a side wall 212 and a bottom wall 213 that enclose to form the receiving space 211. The magnet assembly 22 includes a first magnet 221, a second magnet 222, and a third magnet 223 that are received in the receiving space 211 and arranged in sequence along a first direction X. The first magnet 221, the second magnet 222, and the third magnet 223 are all fixed to the bottom wall 213 by gluing. The mass block 21 further includes a fixation boss 214 protruding from the bottom wall 213 toward the second magnet 222. The second magnet 222 is fixed to the fixation boss 214. It may be understood that, during assembling the first magnet 221, the second magnet 222, and the third magnet 223, the first magnet 221 and the third magnet 223 are fixed to the bottom wall 213 by gluing. In this process, some glue may overflow out of the first magnet 221, but through the arrangement of the fixation boss 214, overflowing of the overflowing glue to the fixation boss 214 can be effectively prevented, which increases a bonding area between the second magnet 222 and the fixation boss 214, thereby enhancing the bonding strength. Along the first direction X, both the first magnet 221 and the third magnet 223 are spaced apart from the fixation boss 214, which further prevents overflowing of the glue to the fixation boss 214, thereby providing a space for the glue during the mounting of the second magnet 222, and prevents influence on flatness of the mounting due to the overflowing between the first magnet 221 and the second magnet 222 or between the third magnet 223 and the second magnet 222.

Figure 3:
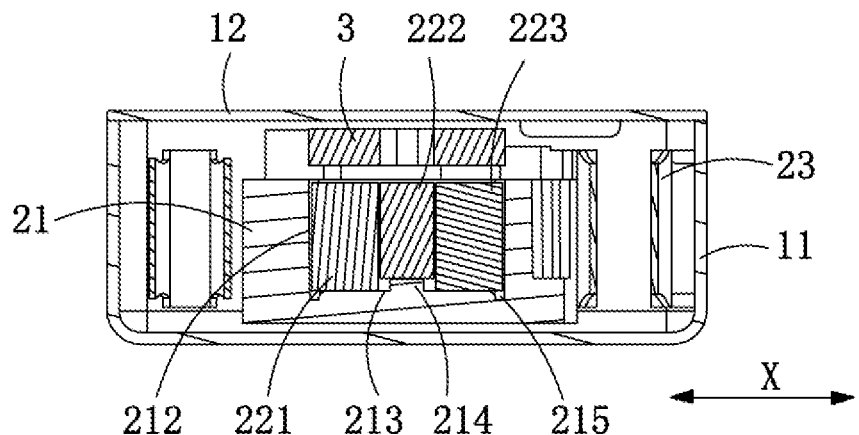
FIG. 3 is a sectional view taken along a line A-A in FIG. 1.
Figure 4:
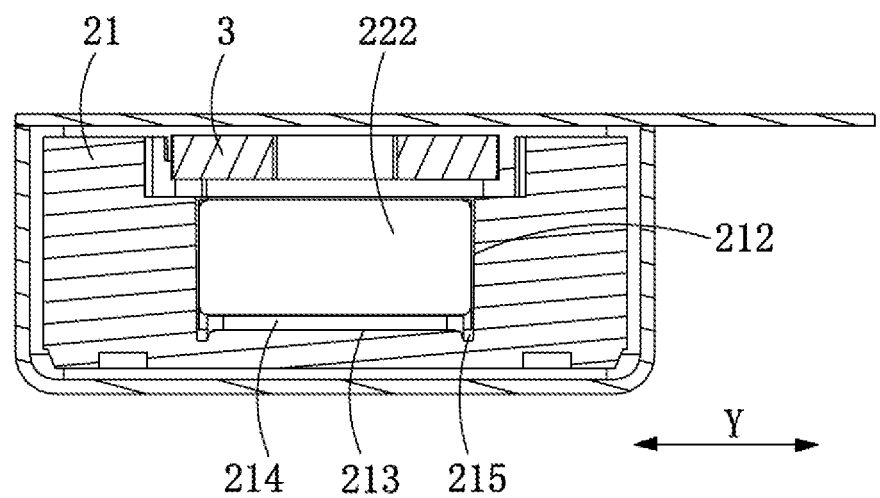
FIG. 4 is a sectional view taken along a line B-B in FIG. 1.
Figure 5:
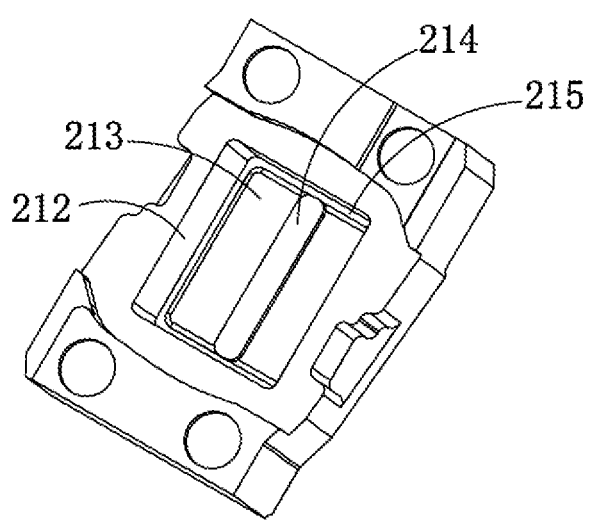
FIG. 5 is a perspective view of a mass block of the linear vibration motor according to an embodiment of the present disclosure.

As shown in FIG. 3, along the first direction X, a width of the fixation boss 214 is less than that of the second magnet 222. As shown in FIG. 4, further, the fixation boss 214 extends along a second direction Y perpendicular to the first direction X, and along the second direction Y, a width of the second magnet 222 is greater than a width of the fixation boss 214.

It may be understood that the first magnet 221, the second magnet 222, and the third magnet 223 all abut against and are fixed to the side wall 212. To this end, an edge of the bottom wall 213 is provided with a glue-receiving groove 215 recessed away from the second magnet 222, and the glue-receiving groove 215 is in a shape of a ring. Along the first direction X, an edge on a side of the first magnet 221 away from the second magnet 222 is arranged corresponding to the glue-receiving groove 215, and an edge on a side of the third magnet 223 away from the second magnet 222 is arranged corresponding to the glue-receiving groove 215. The glue-receiving groove 215 may receive the overflowing glue during mounting the first magnet 221 and the third magnet 223. Along the second direction Y, two ends of the fixation boss 214 extend only to the glue-receiving groove 215, but do not extend above the glue-receiving groove 215.

It may be understood that a surface of the second magnet 222 away from the fixation boss 214 is flush with a surface of the first magnet 221 away from the bottom wall 213. Similarly, the surface of the second magnet 222 away from the fixation boss 214 is also flush with a surface of the third magnet 223 away from the bottom wall 213.

Compared with the related art, the linear vibration motor according to the present disclosure includes a housing with a receiving space, a vibration assembly, and a stator assembly. The vibration assembly includes a mass block received in the receiving space, a magnet assembly fixed to the mass block, and an elastic member that drives the mass block to move back and forth. The mass block is provided with a receiving space for receiving the magnet assembly. The mass block includes a side wall and a bottom wall enclosed to form the receiving space. The magnet assembly includes a first magnet, a second magnet, and a third magnet that are received in the receiving space and arranged in sequence along a first direction. The first magnet, the second magnet, and the third magnet are all fixed to the bottom wall. The mass block further includes a fixation boss protruding from the bottom wall toward the second magnet. The second magnet is fixed to the fixation boss. The bottom wall of the mass block is provided with the fixation boss and the second magnet arranged at a middle position is fixed to the fixation boss, which prevents influence of overflowing glue on a fixed surface between the second magnet and the mass block during assembling the first magnet and the third magnet, effectively enhances bonding strength between the second magnet and the mass block, ensures vibration stability and magnetic field performance of the magnet assembly, and effectively improves vibration performance of the linear vibration motor.

The above descriptions are only embodiments of the present disclosure. It should be pointed out herein that, for those of ordinary skill in the art, improvements can also be made without departing from the creative concept of the present disclosure, all of which fall within the protection scope of the present disclosure.

What is claimed is:
1. A linear vibration motor, comprising:
a housing with a receiving space;
a vibration assembly received in the receiving space; and
a coil received in the receiving space, wherein the vibration assembly comprises a mass block received in the receiving space, a magnet assembly fixed to the mass block, and an elastic member that drives the mass block to move back and forth; the coil is arranged corresponding to the magnet assembly;

the mass block is provided with a receiving space for receiving the magnet assembly;

the mass block comprises a side wall and a bottom wall that enclose to form the receiving space;

the magnet assembly comprises a first magnet, a second magnet, and a third magnet that are received in the receiving space and arranged in sequence along a first direction;

the first magnet, the second magnet, and the third magnet are all fixed to the bottom wall by gluing;

the mass block further comprises a fixation boss protruding from the bottom wall toward the second magnet, the second magnet being fixed to the fixation boss;

the fixation boss extends along a second direction perpendicular to the first direction, and along the second direction, a width of the second magnet is greater than a width of the fixation boss;

an edge of the bottom wall is provided with a glue-receiving groove recessed away from the second magnet, and the glue-receiving groove has a ring shape; and along the second direction, two ends of the fixation boss extend to the glue-receiving groove.

2. The linear vibration motor according to claim 1, wherein, along the first direction, the first magnet and the third magnet are spaced apart from the fixation boss.

3. The linear vibration motor according to claim 1, wherein, along the first direction, a width of the fixation boss is less than a width of the second magnet.

4. The linear vibration motor according to claim 1, wherein, along the first direction, an edge on a side of the first magnet away from the second magnet is arranged corresponding to the glue-receiving groove, and an edge on a side of the third magnet away from the second magnet is arranged corresponding to the glue-receiving groove.

5. The linear vibration motor according to claim 1, wherein a surface of the second magnet away from the fixation boss is flush with a surface of the first magnet away from the bottom wall.

* * * * *